A. F. TIEDGE.
PROTECTOR FOR PNEUMATIC TIRES.
APPLICATION FILED JULY 21, 1914.
1,133,894.
Patented Mar. 30, 1915.
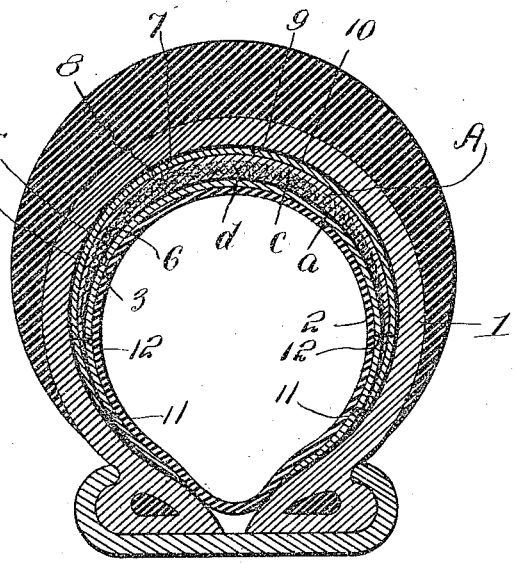
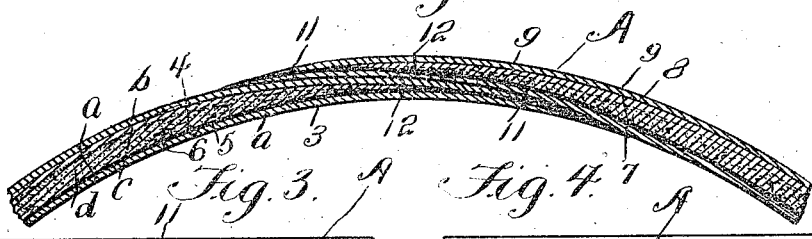
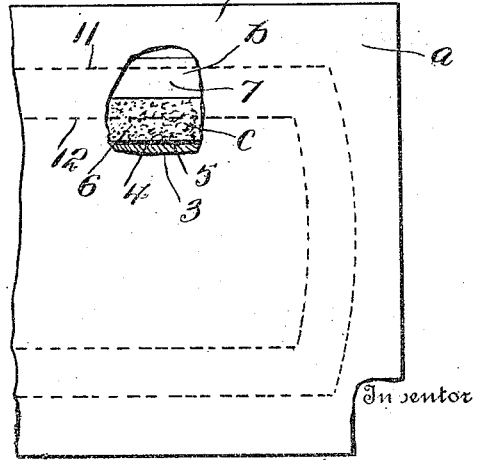
Witnesses
J. L. Wright
P. M. Smith
Inventor
A. F. Tiedge
By Victor J. Evans
Attorney

UNITED STATES PATENT OFFICE.

ARTHUR FREDERICK TIEDGE, OF BAYBRIDGE, OHIO.

PROTECTOR FOR PNEUMATIC TIRES.

1,133,894.

Specification of Letters Patent. Patented Mar. 30, 1915.

Application filed July 21, 1914. Serial No. 852,233.

*To all whom it may concern:*

Be it known that I, ARTHUR F. TIEDGE, a citizen of the United States, residing at Baybridge, in the county of Erie and State of Ohio, have invented new and useful Improvements in Protectors for Pneumatic Tires, of which the following is a specification.

This invention relates to protectors for pneumatic tires, the object in view being to provide a practical and reliable inside reinforcing protector of the class described which is designed to be used between the inner tube and outer case for the purpose of reinforcing and strengthening the outer case of the tire and deflecting nails, tacks and other sharp objects and preventing the same from reaching and puncturing the inner tube.

With the above and other objects in view, the invention consists in the novel construction, combination and arrangement of parts, as herein described, illustrated and claimed.

In the accompanying drawings:—Figure 1 is a cross section through a tire showing the protector of this invention in its proper relation to the outer case and the inner tube. Fig. 2 is a fragmentary longitudinal section illustrating the tapered overlapping extremities of the protector. Fig. 3 is a fragmentary plan view of the outer face of the protector showing one end thereof. Fig. 4 is a fragmentary plan view of the inner face thereof.

Referring to the drawings 1 designates the outer case of a pneumatic tire and 2 the inner tube thereof, both of said parts being of the usual construction. Between the outer case and inner tube the protector of this invention is interposed.

The protector, which is generally designated at A, comprises an inner sheet $a$ of chrome leather, an outer sheet $b$ also of chrome leather and an interposed core $c$. The inner sheet $a$ has its smooth face 3 disposed on the inside of the protector so as to lie in contact with the inner tube 2 and is usually sprinkled with soapstone powder or the like so as to prevent any adherence between the inner tube and the protector. The outer face 4 of the inner sheet A which is rough, is cemented as indicated at 5 to the rough inner face 6 of the core $c$ so as to prevent any relative movement between the inner sheet and the core.

The outer sheet $b$ has its inner smooth face 7 arranged in contact with the outer face 8 of the core, which outer face of the core is formed of chrome leather thereby providing two smooth faces which normally rest in contact with each other. The rough side 9 of the outer sheet $b$ being disposed toward the tread of the tire and being cemented as indicated at 10 to the inside surface of the outer casing to prevent any relative sliding or creeping movement between the protector and the outer case. The core $c$ is in turn provided with a subcore $d$ of fiber which material assists in deflecting sharp objects and preventing the same from reaching the inner tube. However, the main efficiency of the protector lies in the smooth arched outer face of the core $c$ which serves to deflect sharp objects after they have passed through the tread portion of the outer case and the outer sheet $b$ of the protector. One of the sheets, for example the sheet $a$, is made of greater width than the outer sheet $b$ as shown in Fig. 3 and said narrower sheet is secured along its marginal edges to the extremities of the wider sheet by one or more rows of stitches 11 and 12 and also by cementing or gluing the two sheets together around and at opposite sides and extremities of the core $c$. Furthermore the two extremities of the protector are beveled or tapered as shown in Fig. 2 so that when the two ends are brought together in overlapping relation between the inner tube and outer case, there will be little or no variation in the thickness of the protector throughout its entire longitudinal extent. In cross section the core $c$ is crescent shaped, being thickest in the center and tapering therefrom to its side marginal edges thus preserving the rotundity of the tire as a whole.

The protector hereinabove described may be primarily applied to new outer cases but it has been found particularly valuable when applied to old and discarded outer cases which were unfit for further use in connection with an inflated inner tube for the reason that said outer cases were not able to withstand the required pressure to support the vehicle and its load. Old outer cases which have thus been unfit for further use have been equipped with protectors constructed in accordance with the foregoing description and have been run for more than two thousand miles thus establishing the value of this protector.

What I claim is:—

A protector for pneumatic tires to be interposed between the outer case and inner tube, said protector comprising an inside sheet of chrome leather having its smooth face disposed for contact with the inner tube, an outside sheet of the same material having its smooth face disposed in the same direction, said sheets being of different widths and the sheet of less width being marginally fastened to the sheet of greater width, and a cushion of crescent shape in cross section interposed between said inside and outside sheets and cemented to the inside sheet, said cushion embodying a ply of chrome leather covering its outer face with the smooth side toward the tread of the tire and left free and unattached to said outside sheet to form an arched deflecting surface.

In testimony whereof I affix my signature in presence of two witnesses.

ARTHUR FREDERICK TIEDGE.

Witnesses:
  HERMAN STOLL,
  FRED C. STAFFLER.